United States Patent [19]

Cheh et al.

[11] Patent Number: 4,492,649

[45] Date of Patent: Jan. 8, 1985

[54] CARBON DIOXIDE REMOVAL METHOD EMPLOYING PACKED SOLID CALCIUM HYDROXIDE

[76] Inventors: Christopher H. Cheh, 4239 Anworld Pl., Mississauga, Ontario; Roger W. Glass, 2290 Wyandotte Dr., Oakville, Ontario, both of Canada

[21] Appl. No.: 422,479

[22] Filed: Sep. 23, 1982

[30] Foreign Application Priority Data

Jan. 15, 1982 [CA] Canada ................................. 394275
Apr. 23, 1982 [CA] Canada ................................. 401539

[51] Int. Cl.³ .......................... G21F 9/02; B01D 53/34
[52] U.S. Cl. .................................... 252/630; 376/314; 423/230
[58] Field of Search ............... 423/210, 220, 230, 432, 423/437, 438; 376/313, 314; 252/628, 629, 630

[56] References Cited

U.S. PATENT DOCUMENTS 3,519,384  7/1970  Engel et al. ......................... 423/230
4,162,298  7/1979  Holladay et al. .................... 423/230
4,383,969  5/1983  Bleier .............................. 423/230 X

*Primary Examiner*—Earl C. Thomas
*Attorney, Agent, or Firm*—Ridout & Maybee

[57] ABSTRACT

In order to remove carbon dioxide from an off-gas stream and immobilize it in solid stable form, the gas is passed through a packed bed of calcium hydroxide maintained at a temperature in the range 10° C.–50° C., the moisture content of the gas being controlled so as to correspond to a relative humidity from 40% to 100% at the bed temperature.

10 Claims, 1 Drawing Figure

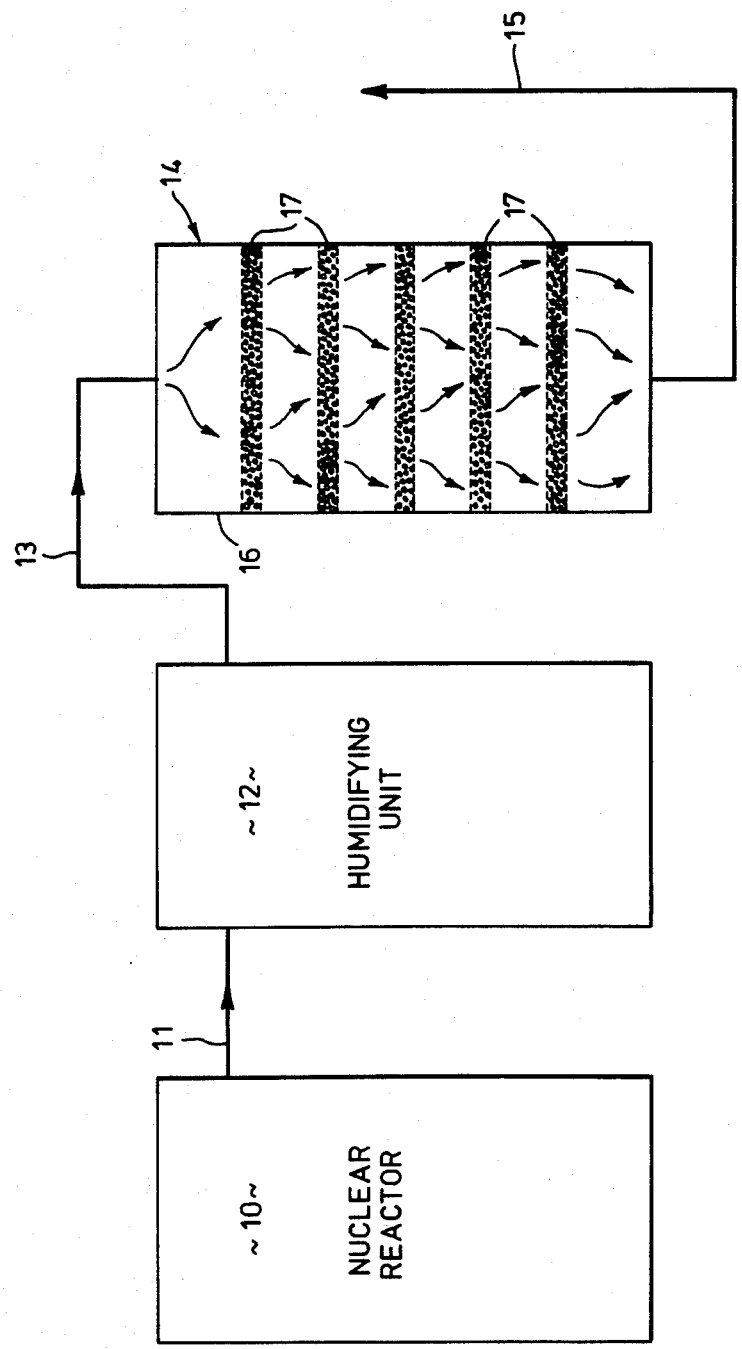

CARBON DIOXIDE REMOVAL METHOD EMPLOYING PACKED SOLID CALCIUM HYDROXIDE

FIELD OF THE INVENTION

This invention relates to a method of removing carbon dioxide from a gas stream. The invention is especially applicable to the immobilization of radioactive carbon dioxide present in industrial off-gas streams, for example waste gas generated in nuclear power plants and the like. However the invention is not limited to such application but is suited to the removal of carbon dioxide from gas streams generally.

BACKGROUND OF THE INVENTION

The known methods of removing carbon dioxide from gases include
 (a) contacting the gas with a lime slurry,
 (b) contacting the gas with solid calcium hydroxide at elevated temperatures, typically 350° C.–450° C., and
 (c) contacting the gas with solid barium hydroxide hydrate at ambient temperatures.

The reaction product calcium carbonate, or barium carbonate, resulting from these methods is highly stable and well suited for long term storage. This offers a very attractive chemical form for the fixation and disposal of radioactive carbon isotopes. However, each of the three methods has disadvantages. The lime slurry method has a contaminated liquid effluent; the solid calcium hydroxide system requires operation at elevated temperatures; while the barium hydroxide hydrate system has the serious disadvantage that barium hydroxide is both toxic and expensive. Applicants have tested a solid calcium hydroxide system at ambient temperatures (20° C.–250° C.), but this was found to be quite unsatisfactory as the conversion of Ca(OH)₂ to CaCO₃ was found to be only about 3%.

However, the applicants have found, quite unexpectedly, that the solid calcium hydroxide system is most effective even at ambient temperatures if the humidity of the gas is raised to a value corresponding to a relative humidity of about 80% or higher measured at the bed temperature. Below 80% relative humidity there is absorption of the carbon dioxide, with consequent conversion of Ca(OH)₂ to CaCO₃ as one would expect, and the conversion increases with relative humidity, but it is only when the relative humidity reaches about 80% that the conversion becomes high enough to be commercially useful. In fact, the conversion continues to increase rapidly throughout the 80%–100% relative humidity range. If the moisture content exceeds the upper limit of this range, however, the utilization of the Ca(OH)₂ is diminished.

Further investigation showed that the bed temperature may be as low as 10° C. provided that the moisture content of the gas is suitably increased. In this case the relative humidity at the bed temperature should be between about 90%–100% for there to be useful conversion, i.e. utilization, of the calcium hydroxide. On the other hand, at higher bed temperatures the relative humidity of the gas may be considerably lower, and may be as low as about 40% if the temperature of the bed is 50° C. The moisture content of the gas may be further reduced for higher bed temperatures, a useful conversion of the calcium hydroxide being obtained, but at bed temperatures above about 50° C. one sacrifices the main advantage of the invention, namely the effective utilization of a calcium hydroxide bed operated at a coveniently low temperature. For the benefit of the invention to be fully realized the bed should be operated in the temperature range 10° C.–50° C., and preferably in the temperature range 20° C.–30° C., the moisture content of the gas stream being controlled accordingly.

U.S. Pat. No. 4,162,298 issued to David W. Holladay and Gary L. Haag, dated July 24, 1979, discloses a method for removing carbon dioxide from industrial off-gas using a particulate bed of barium hydroxide monohydrate wherein the gas is treated so that its relative humidity is in the range 10%–100%. However, no attempt was made to apply this method to a solid calcium hydroxide system, which was believed to be unsuitable. Moreover, subsequent work by Holladay and Haag, as reported in a presentation of the 16th DOE Nuclear Air Cleaning Conference, San Diego, Calif., Oct. 19–24, 1980, indicated that even the barium hydroxide system would be of little practical use if the relative humidity of the gas were too high, owing to degradation of the Ba(OH)₂ particles with resultant capillary condensation of water vapour and a consequent high pressure drop across the packed bed. The present applicants have discovered that the calcium hydroxide system does not have this drawback and will be most effective at very high relative humidities at which the barium hydroxide would be of little use.

SUMMARY OF THE INVENTION

According to the present invention, therefore, there is provided a method of removing carbon dioxide from a gas stream by passing the gas stream through a packed bed of calcium hydroxide, wherein the bed is maintained at a temperature in the range 10° C.–50° C., and wherein the moisture content of the gas is controlled to a value corresponding to a relative humidity in the range 40%–100% a the bed temperature. To be commercially useful the conversion of the calcium hydroxide should be at least 0.15 (i.e. 15%) calculated according to the formula $$\text{Conversion} = \frac{RCT}{22.4} \Big/ \frac{W}{74}$$

where
 R is the gas flow rate,
 C is the carbon dioxide concentration upstream of the bed,
 T is the time required for the downstream concentration of carbon dioxide to reach 5% of the upstream concentration, and
 W is the weight of calcium hydroxide in the bed.

The numbers 22.4 and 74 are respectively the molar volume of the carbon dioxide and the molecular weight of the calcium hydroxide.

The calcium hydroxide should be in a form which permits a substantial flow of the gas through it without excessive pressure drop, and for this it is preferred that the calcium hydroxide be prepared by hydrating CaO, followed by drying and crushing to the required particle size, 0.25 mm–3 mm.

In order to improve the gas flow it has been found advantageous to provide a plurality of packed beds in the form of relatively flat, spaced apart layers of the crushed calcium hydroxide arranged in series with respect to the gas flow.

DESCRIPTION OF THE PREFERRED EMBODIMENT

One exemplary embodiment of the invention is illustrated schematically in the accompanying drawing, which represents a system for removing radioactive carbon dioxide from off-gas generated by a nuclear power plant.

Referring to the drawing, the nuclear power plant is denoted by the reference numeral 10, and off-gas is led away by pipes 11 to a humidifying unit 12. The humidifying unit may be a gas-water contactor, a sprayer or an evaporator, by which the moisture content of the gas is raised. The humidified gas is led from the humidifying unit 12 via piping 13 to an absorption bed system 14, where it is passed through successive beds of calcium hydroxide, and exhausted via piping 15, after removal of the carbon dioxide. The bed temperature is preferably maintained at about 25° C., i.e. between 20° C. and 30° C., in which case the moisture content of the humidified gas must correspond to a relative humidity of between 80%–100% at that temperature.

The unit 14 in the present example comprises a vertical column 16 in which a number of packed beds 17 of the calcium hydroxide are arranged so that the gas will flow through each. Each bed 17 is in the form of a relatively flat layer and is spaced from the adjacent bed so as to permit mixing and redistribution of the gas.

In an experimental pilot plant gas streams containing from 20 to 50000 l of carbon dioxide per liter of gas were treated in the carbon dioxide removal system. The gas streams were humidified to greater than 80% relative humidity at ambient temperature and then passed through a stationary bed of the packed solid calcium hydroxide. The chemical analysis of the absorbent bed is given in Table 1; however it was found that the composition is not critical.

TABLE 1

| Chemical Analysis of the Calcium Hydroxide Used | |
|---|---|
| Compounds | Wt Fraction (g/kg) |
| $Ca(OH)_2$ | 870–900 |
| CaO | 24–33 |
| $CaCO_3$ | 57–86 |
| $H_2O$ | 10–15 |

The conditions and results of these further tests are set out in Table 2.

The tests were also carried out at other bed temperatures and different values of moisture content of the humidified gas. The conditions and results of these further tests are set out in Table 3.

The results of these tests demonstrate that carbon dioxide can be removed from gas streams at ambient temperature, and indeed at temperatures in the range 10° C.–50° C. by calcium hydroxide and a high conversion of the $Ca(OH)_2$ to $CaCO_3$ can be achieved if the gas is first conditioned to high humidity.

TABLE 2

Conditions and Results of the Tests

| Gas Flow Rate (L/min) | $CO_2$ Concentration ($\mu$L/L) | Relative Humidity (%) | $Ca(OH)_2$ Particle Size (mm) | $Ca(OH_2)$ Bed Configuration and Weight | $Ca(OH)_2$ Bed Temperature (°C.) | $Ca(OH)_2$ Conversion (%) | $CO_2$ Concentration Downstream of Bed ($\mu$L/L) |
|---|---|---|---|---|---|---|---|
| 0.2 (nitrogen) | 50 000 | 100% at 25° C. | 0.595–2.38 | 2.5 cm diameter 7.5 cm deep, 14.4 g | 25–30 | >40 | <3 |
| 0.2 (nitrogen) | 50 000 | 100% at 25° C. | 0.250–0.595 | 2.5 cm diameter 7.5 cm deep, 14.4 g | 25–30 | >40 | <3 |
| 2.0 (air) | 300–400 | 100% at 25° C. | 0.595–2.38 | 2.5 cm diameter 3.75 cm deep, 7.2 g | 25–30 | >40 | <1 |
| 2.0 (air) | 300–400 | 100% at 25° C. | 0.250–0.595 | 2.5 cm diameter 3.75 cm deep, 7.2 g | 25–30 | >40 | <1 |
| 140 (nitrogen) | 22 | 80% at 17° C. | 0.595–2.38 | 20 cm diameter 37.5 cm deep, 5 kg | 25–30 | —* | <1 |
| 140 (nitrogen) | 28 | 80% at 17° C. | 0.595–2.38 | 20 cm diameter 37.5 cm deep, 5 kg | 200 | —** | <1 |

*The test was carried out for about 1000 hours, with no increase in $CO_2$ concentration downstream of tne bed, conversion of the $Ca(OH)_2$ will be determined.
**The test was carried out for about 80 hours with no increase in $CO_2$ concentration downstream of the bed, conversion of the $Ca(OH)_2$ was not determined.

TABLE 3

CONDITIONS AND RESULTS OF THE TESTS IN A $Ca(OH)_2$ BED 2.5 cm DIAMETER, 3.8 cm DEEP WITH 7.2 g OF $Ca(OH)_2$ IN THE SIZE OF 0.595 TO 2.38 mm

| Gas Flow Rate (L/min) | $CO_2$ Concentration ($\mu$L/L) | Relative Humidity (%) | $Ca(OH)_2$ Bed Temperature (°C.) | $Ca(OH)_2$ Conversion* When $CO_2$ Concentration Downstream of Bed Reached 5% of the Inlet $CO_2$ Concentration (%) |
|---|---|---|---|---|
| 2.0 | 380–390 | 12% at 25° C. | 24–25 | 1.3 |
| 2.0 | 265–270 | 24% at 24° C. | 24 | 2.2 |
| 2.0 | 305–310 | 48–51% at 24° C. | 24 | 1.6 |
| 2.0 | 320 | 50% at 23° C. | 23 | 3.6 |
| 2.0 | 290–305 | 67–74% at 24° C. | 24 | 14.1 |
| 2.0 | 300 | 84% at 26° C. | 26 | 21.4 |
| 2.0 | 310–355 | 85% at 25° C. | 25 | 31.2 |
| 2.0 | 330 | 89–92% at 23–25° C. | 23–25 | 49.5 |
| 2.0 | 300 | 86–96% at 23–25° C. | 23–25 | 34.4 |
| 2.0 | 300 | 26% at 50° C. | 50 | 4.4 |
| 2.0 | 300 | 46% at 50° C. | 50 | 18.4 |
| 2.0 | 300 | 69% at 44° C. | 40 | 45.9 |
| 2.0 | 310 | 100% at 9.8° C. | 9.8 | 54.7 |

TABLE 3-continued

CONDITIONS AND RESULTS OF THE TESTS IN A Ca(OH)$_2$ BED 2.5 cm DIAMETER, 3.8 cm DEEP WITH 7.2 g OF Ca(OH)$_2$ IN THE SIZE OF 0.595 TO 2.38 mm

| Gas Flow Rate (L/min) | CO$_2$ Concentration (μL/L) | Relative Humidity (%) | Ca(OH)$_2$ Bed Temperature (°C.) | Ca(OH)$_2$ Conversion* When CO$_2$ Concentration Downstream of Bed Reached 5% of the Inlet CO$_2$ Concentration (%) |
|---|---|---|---|---|
| 2.0 | 310 | 89–92% at 9.8–10° C. | 9.8–10 | 21.9 |
| 2.0 | 310 | 78–79% at 9.6–10° C. | 9.6–10 | 5.4 |

*Ca(OH)$_2$ Conversion is calculated by the equation:

$$\text{Conversion (\%)} = \frac{\text{Gas Flow Rate} \times \text{CO}_2 \text{ Concentration} \times \text{Time at 5\% Breakthrough}/22.4}{\text{Wt of Ca(OH)}_2 \text{ in Bed}/74} \times 100$$

It is to be understood that the gas stream may be at a temperature substantially higher than ambient, in which case its relative humidity at that higher temperature may be substantially less than 80%. The essential thing is that the moisture content of the gas, prior to passage through the bed, should correspond to a relative humidity of between 40% and 100% at the bed temperature and be controlled according to the bed temperature so as to achieve a conversion of the calcium hydroxide of at least 15%.

For the treatment of industrial off-gas it is generally necessary to humidify the gas stream to bring its moisture content up to the required value prior to passing the gas stream through the bed, as described above. However, in cases where the initial humidity of the gas is higher than the required value, as for example in rebreathing apparatus, it is generally necessary to control the humidity by extracting moisture.

We claim:

1. A method of removing carbon dioxide from a gas stream by passing the gas stream through a packed bed of calcium hydroxide, wherein the bed is maintained at a temperature in the range 10° C.–50° C., and wherein the moisture content of the gas is controlled to a value corresponding to a relative humidity in the range 40%–100% at the bed temperature and such that the resultant conversion of calcium hydroxide is not less than 0.15, the conversion being defined by $$\frac{RCT}{22.4} \Big/ \frac{W}{74}$$

where
R is the gas flow rate,
C is the carbon dioxide concentration upstream of the bed,
T is the time required for the downstream concentration of carbon dioxide to reach 5% of the upstream concentration, and
W is the weight of calcium hydroxide in the bed.

2. A method according to claim 1, wherein the bed is maintained at a temperature in the range 20° C.–30° C., the moisture content of the gas stream corresponding to a relative humidity in the range 80%–100% at the bed temperature.

3. A method according to claim 1 or claim 2, wherein the initial moisture content of the gas stream corresponds to a relative humidity greater than 100% at the bed temperature, said control comprising dehumidifying the gas prior to passage through the bed.

4. A method according to claim 1 or claim 2, wherein the initial moisture content of the gas stream corresponds to a relative humidity less than the minimum of said relative humidity range at the bed temperature, said control comprising humidifying the gas stream prior to passage through the bed.

5. A method of removing carbon dioxide from a stream of industrial off-gas by passing the gas stream through a packed bed of calcium hydroxide maintained at a temperature in the range 10° C.–50° C., including the step of humidifying the gas stream to raise its moisture content to a value corresponding to a relative humidity in the range 40%–100% at the bed temperature and such that the resultant conversion of calcium hydroxide is not less than 0.15, the conversion being defined by $$\frac{RCT}{22.4} \Big/ \frac{W}{74}$$

where
R is the gas flow rate,
C is the carbon dioxide concentration upstream of the bed,
T is the time required for the downstream concentration of carbon dioxide to reach 5% of the upstream concentration, and
W is the weight of calcium hydroxide in the bed.

6. A method according to claim 5, wherein the bed is maintained at a temperature in the range 20° C.–30° C., the moisture content of the gas stream corresponding to a relative humidity in the range 80%–100% at the bed temperature.

7. A method of removing and immobilizing carbon dioxide from a gas stream including carbon dioxide containing radioactive carbon as a constituent, which comprises providing a gas filter comprising a packed bed of solid Ca(OH)$_2$ prepared by hydrating CaO and drying, crushing and packing the resultant hydroxide, contacting the gas stream with water to raise its moisture content to a value corresponding to a relative humidity in the range 80%–100% at the temperature of the bed, and flowing the humidified gas stream through the gas filter to effect conversion of the calcium hydroxide to calcium carbonate.

8. A method according to claim 7, wherein the temperature of the bed is in the range 20° C.–30° C.

9. A method according to claim 7, wherein the gas filter is formed by a column comprising a plurality of relatively flat, spaced apart beds of crushed solid calcium hydroxide, the column defining a gas flow path and the beds being arranged in series with respect to said flow path, the spacings between the beds modifying the gas flow to effect redistribution thereof between the filter stages.

10. A method according to claim 9, wherein the temperature of the bed is 20° C.–30° C.

* * * * *